US012694487B2

(12) United States Patent
Dcosta et al.

(10) Patent No.: US 12,694,487 B2
(45) Date of Patent: Jul. 28, 2026

(54) BRIGHTNESS AND SCALE-INVARIANT LOW-LIGHT IMAGE DENOISER

(71) Applicant: Lenovo (Singapore) Pte. Ltd., Singapore (SG)

(72) Inventors: Angela Vivian Dcosta, Bangalore (IN); Rafael Marius Radkowski, Cary, NC (US); Chunbo Song, Arlington, VA (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 291 days.

(21) Appl. No.: 18/425,271

(22) Filed: Jan. 29, 2024

(65) Prior Publication Data

US 2025/0245794 A1 Jul. 31, 2025

(51) Int. Cl.

| | |
|---|---|
| *G06T 5/73* | (2024.01) |
| *G06T 5/60* | (2024.01) |
| *G06T 5/70* | (2024.01) |
| *G06V 10/60* | (2022.01) |
| *G06V 10/764* | (2022.01) |
| *G06V 10/82* | (2022.01) |

(52) U.S. Cl.
CPC .................. *G06T 5/73* (2024.01); *G06T 5/60* (2024.01); *G06T 5/70* (2024.01); *G06V 10/60* (2022.01); *G06V 10/764* (2022.01); *G06V 10/82* (2022.01)

(58) Field of Classification Search
CPC ................ G06T 5/60; G06T 5/70; G06T 5/73
See application file for complete search history.

(56) References Cited

U.S. PATENT DOCUMENTS

| | | | | |
|---|---|---|---|---|
| 9,189,831 | B2 * | 11/2015 | Wu ............................ | G06T 5/73 |
| 10,419,698 | B2 * | 9/2019 | Murakami ........... | G02B 21/367 |
| 2015/0063718 | A1 * | 3/2015 | Mantzel ................... | G06T 5/50 |
| | | | | 382/274 |
| 2023/0186446 | A1 * | 6/2023 | Marti ........................ | G06T 5/92 |
| | | | | 382/274 |

(Continued)

FOREIGN PATENT DOCUMENTS

| | | | | | |
|---|---|---|---|---|---|
| CN | 119887554 A | * | 4/2025 | ............... | G06T 5/60 |

OTHER PUBLICATIONS

"Essential image and video finishing tools", Topaz Labs Products DeNoise AI and Video AI, [Online]. Retrieved from the Internet: URL: https: www.topazlabs.com, (Mar. 2, 2023), 6 pgs.

(Continued)

*Primary Examiner* — Scott A Rogers
(74) *Attorney, Agent, or Firm* — Schwegman Lundberg & Woessner, P.A.

(57) ABSTRACT

Software for image enhancement can implement operations including receiving an input image and saving the input image as a reference image. Operations can further include enhancing a brightness level of the input image to generate an enhanced input image. Operations can further include generating an upsampled image using the lowlight reference image and enhanced image. Operations can further include generating a noise reduced image by adjusting pixels of the enhanced input image based on a brightness invariant noise reduction algorithm and the reference image. Operations can further include implementing a sharpening algorithm on the noise reduced image to generate a display image.

21 Claims, 10 Drawing Sheets

100

103

High Res | Low Res 104 106 Low-Light Enhancer | Low Res 108 110 AGU | 112 High Res Ours 102 Low-Light Image | Enhanced | Upsampled

(56)                    References Cited

U.S. PATENT DOCUMENTS

2024/0303782 A1*   9/2024   Yang ......................... G06T 5/94

OTHER PUBLICATIONS

"Skylum Luminar Neo", [Online]. Retrieved from the Internet: URL: https: skylum.com luminar, (Mar. 2, 2023), 9 pgs.

"AI Noise Reduction Software for Photos", ON1 NoNoise AI, [Online]. Retrieved from the Internet: URL: https: www.on1.com products photo-raw nonoise, 14 pgs.

Guo, Yu, "Low-light Image Enhancement with Deep Blind Denoisin", Proceedings of the 2020 12th International Conference on Machine Learning and Computing, (2020), 7 pgs.

Harper, Jayden, "Denoise AI: Remove Grain, Noise, JPEG Artifact from Image", VanceAI Image Denoiser, [Online]. Retrieved from the Internet: URL: https: vanceai.com denoise-ai, (Mar. 2, 2023), 12 pgs.

He, Kaiming, "Fast Guided Filter", ArXiv, abs 1505.00996, (2015), 2.

He, Kaiming, "Guided Image Filtering", IEEE Transactions on Pattern Analysis and Machine Intelligence, 35, (2010), 14 pgs.

Kim, Sang Ho, "Optimal unsharp mask for image sharpening and noise removal", ISandT SPIE Electronic Imaging, (2004), 11 pgs.

Pham, Cuong Cao, "Efficient image sharpening and denoising using adaptive guided image filtering", IET Image Process., 9, (2015), 9 pgs.

Tomasi, C, "Bilateral filtering for gray and color images", Sixth International Conference on Computer Vision (IEEE Cat. No.98CH36271), (1998), 8 pgs.

Xiong, Wei, "Unsupervised Low-light Image Enhancement with Decoupled Networks", 2022 26th International Conference on Pattern Recognition (ICPR, (2022), 12 pgs.

Yahya, Ali Abdullah, "BM3D image denoising algorithm based on an adaptive filtering", Multimedia Tools and Applications, (2020), 38 pgs.

Yaseen, Alauldeen Salah, "Wavelet-Based Denoising of Images", Engineering and Technology Journal, vol. 37, Part B, No. 02, 2019, (2019), 7 pgs.

Zhang, Buyue, "Adaptive Bilateral Filter for Sharpness Enhancement and Noise Removal", IEEE Transactions on Image Processing, 17, (2008), 15 pgs.

Zhao, Yiyun, "Pyramid Real Image Denoising Network", 2019 IEEE Visual Communications and Image Processing (VCIP), (2019), 5.

Zou, Xiufang, "WGAN-Based Image Denoising Algorithm", Journal of Global Information(2022), 20 pgs.

* cited by examiner

BRIGHTNESS AND SCALE-INVARIANT LOW-LIGHT IMAGE DENOISER

TECHNICAL FIELD

Embodiments described herein generally relate to image noise and image upsampling, and in an embodiment, but not by way of limitation Image upsampling while maintaining other quality of metrics of those images such as low noise and high sharpness.

BACKGROUND

Computer device cameras often generate images with various technical limitations, including image noise. This noise may be introduced in camera sensors and other circuitry downstream from the camera sensors in the form of photon shot noise, gain noise, and other types of noise. Low-light images may be particularly vulnerable to noise and noise sources. Some denoising methods and tools can reduce noise but result in tradeoffs such as reduced sharpness and increased blur.

Computer device cameras need to operate at high framerates (30 fps). Lowlight images are also captured at 15 fps, denoising methods need to maintain the camera framerate. Some denoising methods work effectively but come with the tradeoff of lower framerates.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Most user devices today include at least one imaging device. For example, laptops can include a camera within the laptop lid housing, an externally-connected camera (e.g., "webcam") or other camera or imaging device. Imaging devices may experience or exhibit technical limitations that can be introduced in the imaging device itself or in the downstream processing pipeline. These limitations can include noise such as photon shot noise, gain noise, etc. Noise issues can be particularly noticeable with images captured in low-light.

Some image processing tools may provide noise removal features for post-processing of images. However, these tools are not real-time capable. Other noise-removal tools may be computationally expensive and not practical or affordable for individual laptop users. Other tools use reference-based noise filters but these tools may underperform in low-light conditions for different reasons explained below. Methods and systems according to various embodiments address these concerns by using a reference image (based on the input image to be processed) and separately controlling for brightness to maintain brightness invariance to enhance sharpness in real-time. Secondly, methods and algorithms according to various embodiments can generate upsampled images with the previously mentioned attributes. Thirdly, methods and algorithms according to embodiments can provide images without adverse image artifacts. Fourthly, methods and algorithms according to embodiments can provide images with reduced noise. Methods and algorithms according to embodiments can include software solutions that operate using standard user device processing circuitry (e.g., standard central processing units (CPUs) and graphics processing units (GPUs)) in real time, thereby providing a processing solution that conserves processing and memory resources.

Figure 1:
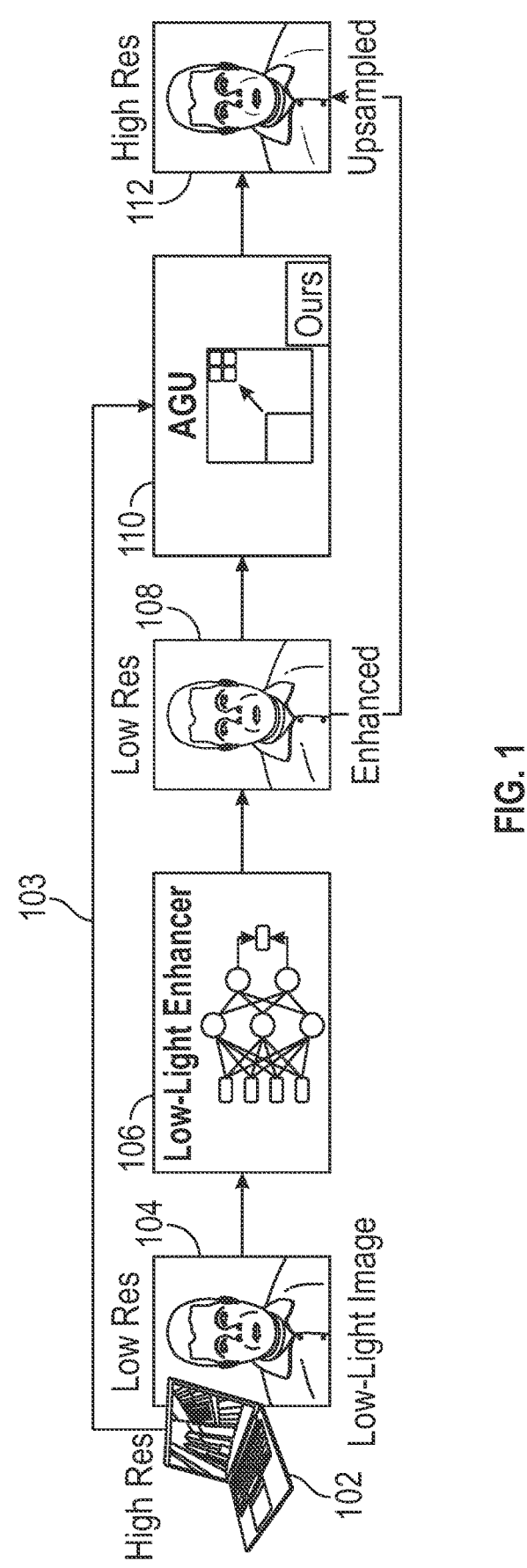
FIG. 1 is a high-level block diagram of a system for enhancing lowlight image brightness and reducing imaging sensor noise and maintaining sharpness according to some embodiments.

FIG. 1 is a high-level block diagram of a system 100 for upsampling images, reducing imaging sensor noise and maintaining sharpness according to some embodiments. A user device 102 (e.g., a laptop) provides an image 104 for processing. A reference image 103 can be retained and provided for later processing. The image 104 can be a low-resolution low-light image in some embodiments, although image processing according to embodiments can also be implemented on better-quality images and embodiments are not limited to low-resolution low-light images.

The image 104 can be passed through a low-light enhancer 106 to generate an enhanced image 108. The low-light enhancer 106 can comprise an autoencoder-based model. Brightness enhancement can be performed at low-light enhancer 106 at a low resolution than the actual input resolution to reduce computational costs. Some previously-available solutions performed upsampling of the image 108 using a bilinear interpolation, which comes with a tradeoff of making the upsampled image blurry. In contrast, example embodiments can avoid this blurriness and maintain the sharpness at edges within the input image.

Embodiments provide an adaptive guided upsampling block 110. In the context of embodiments, "guided" refers to the presence of a guidance image (hereinafter a "reference image"). The reference image comprises the original image captured by a user device and stored in a memory local or remote to the user device 102 to act as a reference in subsequent operations according to some embodiments. Embodiments can execute or implement an adaptive guided filter using a plurality of parameters to control brightness, sharpness and blur in the upsampled output image 112.

Algorithms according to embodiments account for a brightness delta between the reference image 103 and the enhanced image 108 (where, as described above, the enhanced image 108 is a brightness-enhanced version of the input image 104). The brightness delta is accounted for with a parameter $\tau$ to provide brightness invariance and to allow more control of variables controlling the enhancement of the final output image 112. Variables and values for those variables can be adjusted based on machine learning algorithms as described later herein.

Embodiments can optimize model equation (1):

$$E(a_k, b_k) = \sum_{p \in w_k} (a_k(G_p + \xi_{p\_boosted} + \tau_p) + b_k - I_p)^2 + \varepsilon a_k^2$$

where $\xi$ accounts for sharpness to be added back to generate the final image 112, $\varepsilon$ represents a smoothing parameter (e.g., representative of blur), defined as $\varepsilon = \lambda \sigma^2$ where $\lambda$ is a constant and $\sigma$ is the blurring parameter. $\tau$ accounts for brightness as described herein. Further details concerning training for $\tau$ are provided with reference to FIG. 5.

Figure 2:
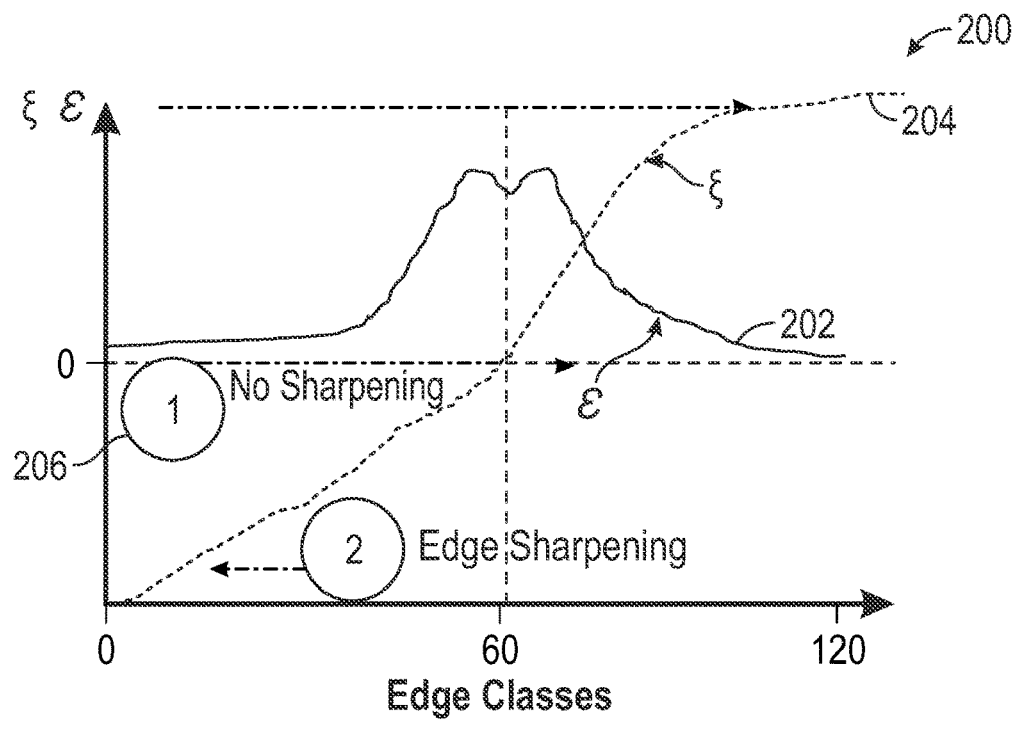
FIG. 2 illustrates characteristic curves for brightness and sharpening and noise reduction according to some embodiments.
Figure 2:
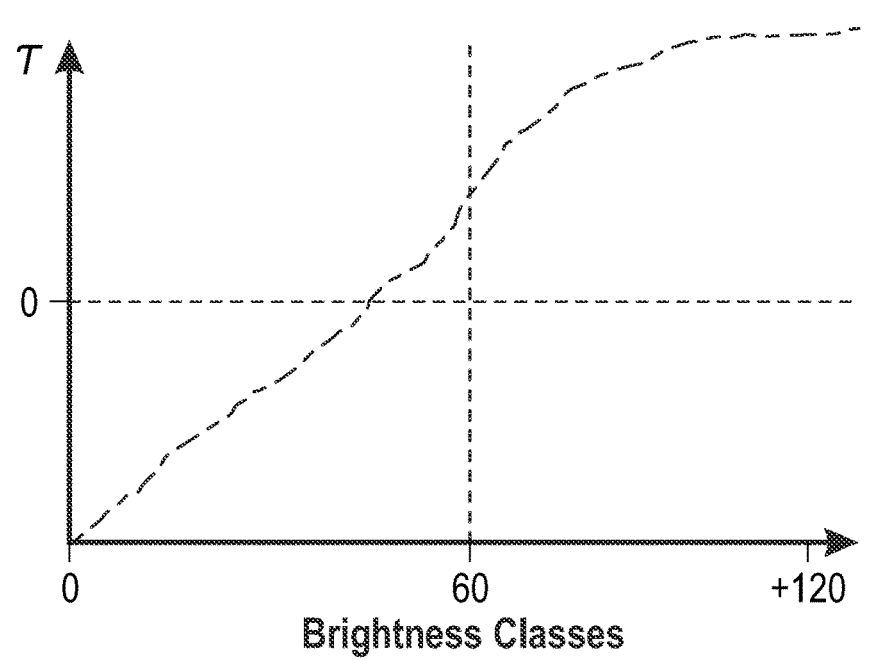

Referring to FIG. 2, the parameters $\xi$ and $\varepsilon$ are applied to a pixel based on whether the pixel belongs to an edge within the reference image or not. Values for an edge can represent the strength of the edge, such that one center value represents that the pixel is not on an edge at all, and other values to either side of the center value indicate strength of the edge, wherein the further the value is from the center value, the stronger the edge. The x-axis in the above graph basically represents the strength of the edge. For example, as seen along the x-axis, values on either side of the center class at 60 represent edges, farther away from the center stronger the edges. Values at class 60 refer to uniform areas in the image (e.g., no edges). The values appearing in FIG. 2 along the x-axis are intended as examples only, and other values can be provided indicating class in some other embodiments.

Since $\xi$ is a sharpening parameter the effect of $\xi$ in the darker regions of the image will be less noticeable unless the contrast in the darker regions of the image is increased. Curve 204 represents a characteristic behavior of the parameter $\xi$ in the model represented in Equation (1). On uniform/flat regions of the image the sharpening should be such that noise is at the minimum so adding sharpness back to these pixels would only bring back noise, therefore $\xi$ is minimal (e.g., 0) as shown at point 206. Elsewhere, more sharpening may be desired.

Referring at the same time to FIG. 1, if the brightness delta between the reference image 103 and the enhanced image 108 is high, then the behavior of $\xi$ may deviate from curve 204 meaning that sharpness cannot be maintained in the presence of brightness differences. Accordingly, embodiments further control the variable $\tau$ as shown in Equation (1) and the bottom half of FIG. 2. Because $\tau$ accounts for brightness, $\xi$ can maintain a characteristic as shown at curve 204 to account for sharpness. In examples, $\tau$ accounts for brightness differences between the reference image 103 and the enhanced image 108 that could otherwise overpower sharpness correction. In this way, algorithms for image processing according to embodiments can maintain sharpness under all brightness conditions.

For $\tau$ every pixel is classified based on the brightness difference between the reference image 103 and brightened image 108. If the difference (e.g., the delta) between the reference image 103 and brightened image 108 is high then t is high, since a higher value needs to be added back to the lowlight input to compensate for the brightness difference. Similarly, if the brightness difference is low or negative (e.g., regions in brightened image 108 are actually darker than the corresponding pixel in the reference image 103)

then a value is subtracted (e.g., $\tau$ is negative) to achieve similar brightness levels in both images.

Regarding $\varepsilon$, if a pixel belongs to an edge the effect of blurring should be minimum therefore the $\varepsilon$ values should be low at edges. On flat areas of the image blurring should be maximized. However, when maximized the texture details of the image can be lost. Accordingly, some number below the maximum is used as represented by the dip on the $\varepsilon$ curve 202 at flat regions.

The above parameters $\xi$, $\varepsilon$, and $\tau$ can be trained-for or learned according to machine learning algorithms described herein with reference to FIG. 4-8.

Figure 3:
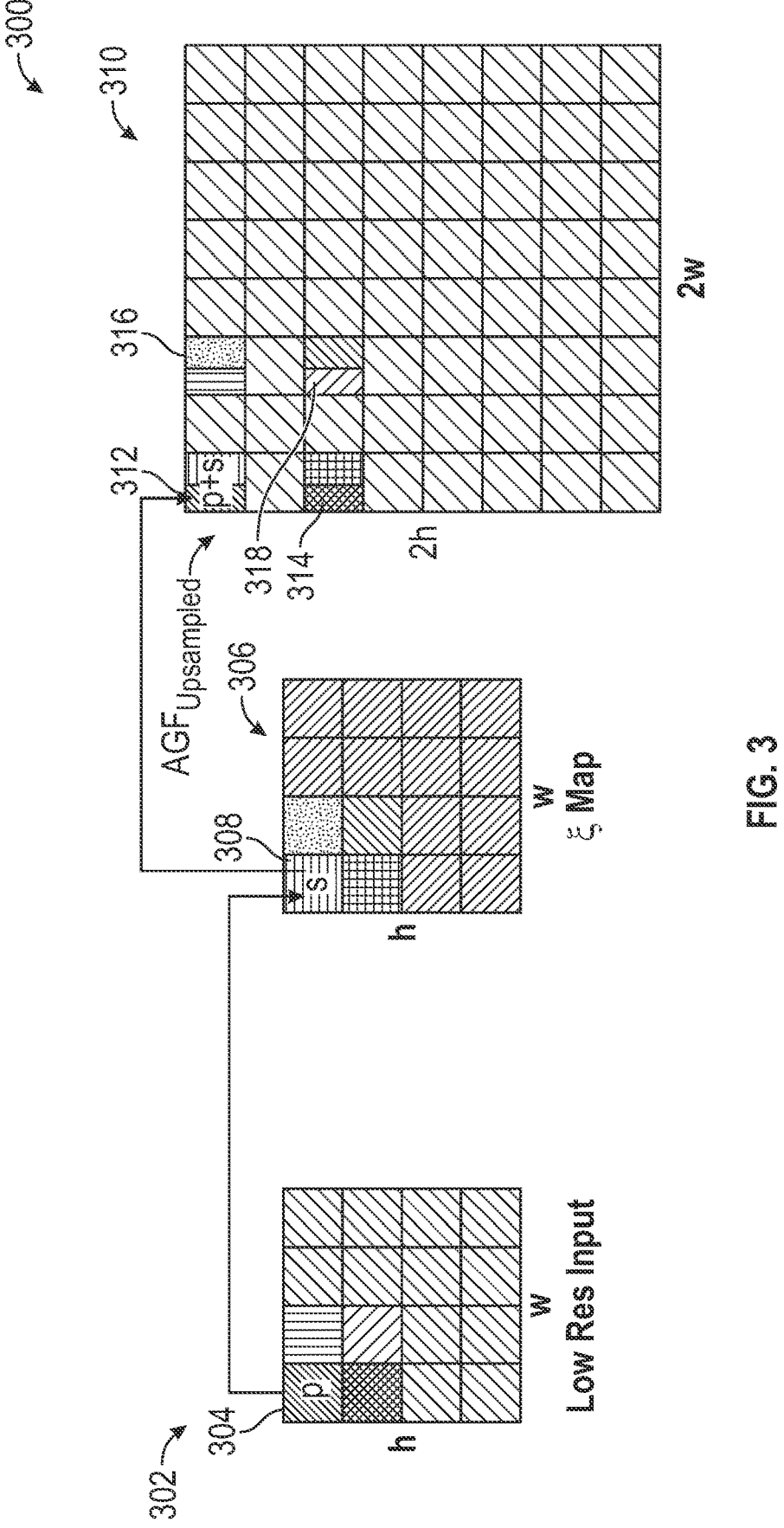
FIG. 3 illustrates scale invariant upsampling according to some embodiments.

Algorithms according to various embodiments can also implement over-sharpening to help ensure that, once an enhanced image is upsampled, the sharpness is maintained at least at the same level as the low-resolution input image 104. Algorithms implement this over-sharpening using scale-invariant upsampling. FIG. 3 illustrates scale invariant upsampling 300 according to some embodiments.

In the context of image processing, scale-invariance refers to the use of different image resolutions in training and run-time images without adding scaling artifacts. Previous solutions work with one fixed resolution for all images and lack model components addressing various scales. Instead, in previous solutions, model components used same-scale training and run-time data, which could cause quantization artifacts perceivable as discrete boundaries in the output image. In contrast, solutions according to embodiments provide a scale-invariant model that compute model components ($A_{upsampled}$ and $b_{upsampled}$ in Equation (2) below) during training and running on a low-resolution image, scales the model components to the shape of the target image, and applies the model components. The algorithms according to embodiments scale the parameter vectors using a class-based bilinear transformation, where the classes represent different sharpness grades of image content. The image is transformed between scales and a class-dependent non-linear correction is further applied to $\xi$ to counter the blurring effect of a bilinear transformation. Solutions according to embodiments preserve image stability and phase properties and, accordingly, image sharpness. Solutions also prevent artifact generation.

The original low-resolution input image 302 is shown on a pixel-by-pixel basis in FIG. 3. Algorithms according to embodiments can perform targeted over-sharpening using a gradient based edge classification method. This method can add a boost factor on a pixel-by-pixel basis for each pixel to be rendered. The boost factor can be determined based on the original pixel value 304 and values for neighboring pixels as shown in FIG. 3.

Equation (2) can be applied to the image 302:

$$AGF_{upsampled} = A_{upsampled}(G + \xi_{boosted} + \tau) + b_{upsampled}$$

where G is the reference image, and $A_{upsampled}$ and $b_{upsampled}$ are linear coefficients calculated based on the low resolution original and enhanced (brightened) images.

The $\xi$ (sharpness) parameter of original pixel 304 is modified using the map 306. For example, because $\xi$ gives a sharpness value, oversharpness is provided according to map element 308 to generate $\xi_{boosted}$. When $\xi_{boosted}$ is applied over the entire image using Equation (2), an example image can be shown at 310. For example, pixel 320 can be generated in the final upsampled output image 310 by combining neighboring pixels of pixel 304 (312, 314, 316, 318 in the upsampled image) with oversharpness according to the map 306. The operation is performed pixel wise on all pixels in the upsampled image 310.

Figure 4:
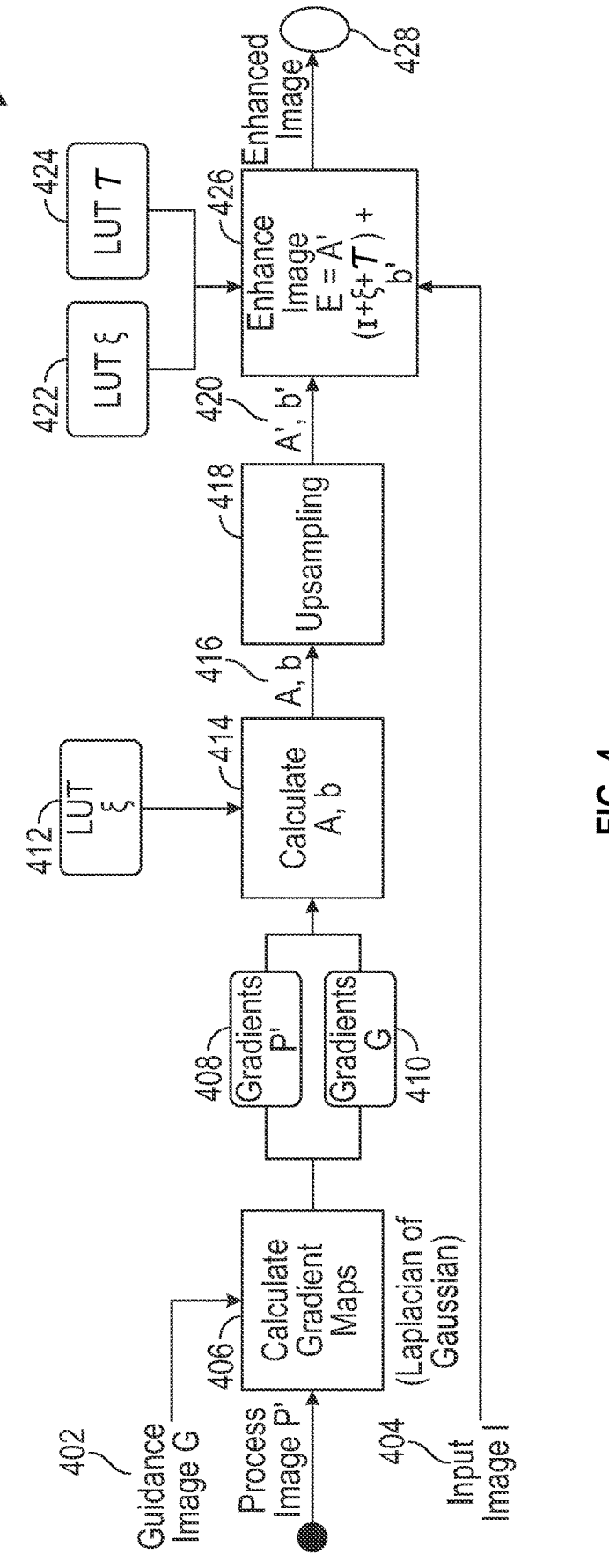
FIG. 4 illustrates an adaptive guided upsampling method according to some embodiments.

FIG. 4 illustrates an adaptive guided upsampling method according to some embodiments. In FIG. 4, the process image P' can be similar to the brightened image 108 (FIG. 1). The reference image 402 can be similar to reference image 103 (FIG. 1) which can comprise the original input image 404 saved to memory for later reference. From the process image P', methods according to various embodiments can generate gradient maps at 406. Embodiments are not limited to any particular type or definition of gradient maps.

In the context of embodiments, the gradient is the change in the direction of the intensity level of an image (e.g., the process image P'), and can be used to measure how the image changes for use in detecting the presence of an edge. Gradients can be calculated for both the process image P' and the reference image at blocks 408 and 410. The value σ can be retrieved from a lookup table 412, wherein the lookup table 412 can be populated using machine learning as described with reference to FIG. 6 and FIG. 8. Based on ξ, the 408, 410 and the reference image 402 coefficients A and b can be calculated 414, upsampled as in block 418 and used as described at Equation (2) in block 426. The output image 426 can be calculated according to Equation (1) using lookup table 422 for ξ and lookup table 424 for τ. The output image 426 can be provided at output 428. The lookup tables 422, 424 can be populated according to machine learning algorithms described with reference to FIG. 5, FIG. 7, and FIG. 8.

The lookup table 424 represents the brightness shifts in a discrete manner. The lookup table 424 is used during running time to retrieve the value τ per pixel. This can save running time and supports real-time processing. Computing the parameter τ for the lookup table 424 may be done using class discrimination based on image brightness. The brightness class range and label of each pixel can be quantized according to the pixel brightness level. Pixels of each label can be binned and optimized per bin. In some example embodiments, quantized brightness levels can be used as classes for identifying an optimal parameter τ for every possible brightness difference for one or more channels or elements of a color spectrum (e.g., the Y channel of the YUV color spectrum).

Training can make use of mean-squared error (MSE) although embodiments are not limited thereto. Training can be split into at least three processes, with a first process training the parameter τ. In the second process, σ is trained and in the third process η is trained. Training in three processes can lead to faster convergence without sacrificing accuracy. Solutions according to embodiments can be executed real-time (e.g., within less than 0.01 second) capable and can denoise the results of the low-light enhancer (LLNet) to maintain sharpness of the input image. Processing times (<0.01 s) suggest that embedding the filter into the camera processing pipeline of a user device (e.g., laptop) will not affect power consumption and processor utilization significantly.

Figure 5:
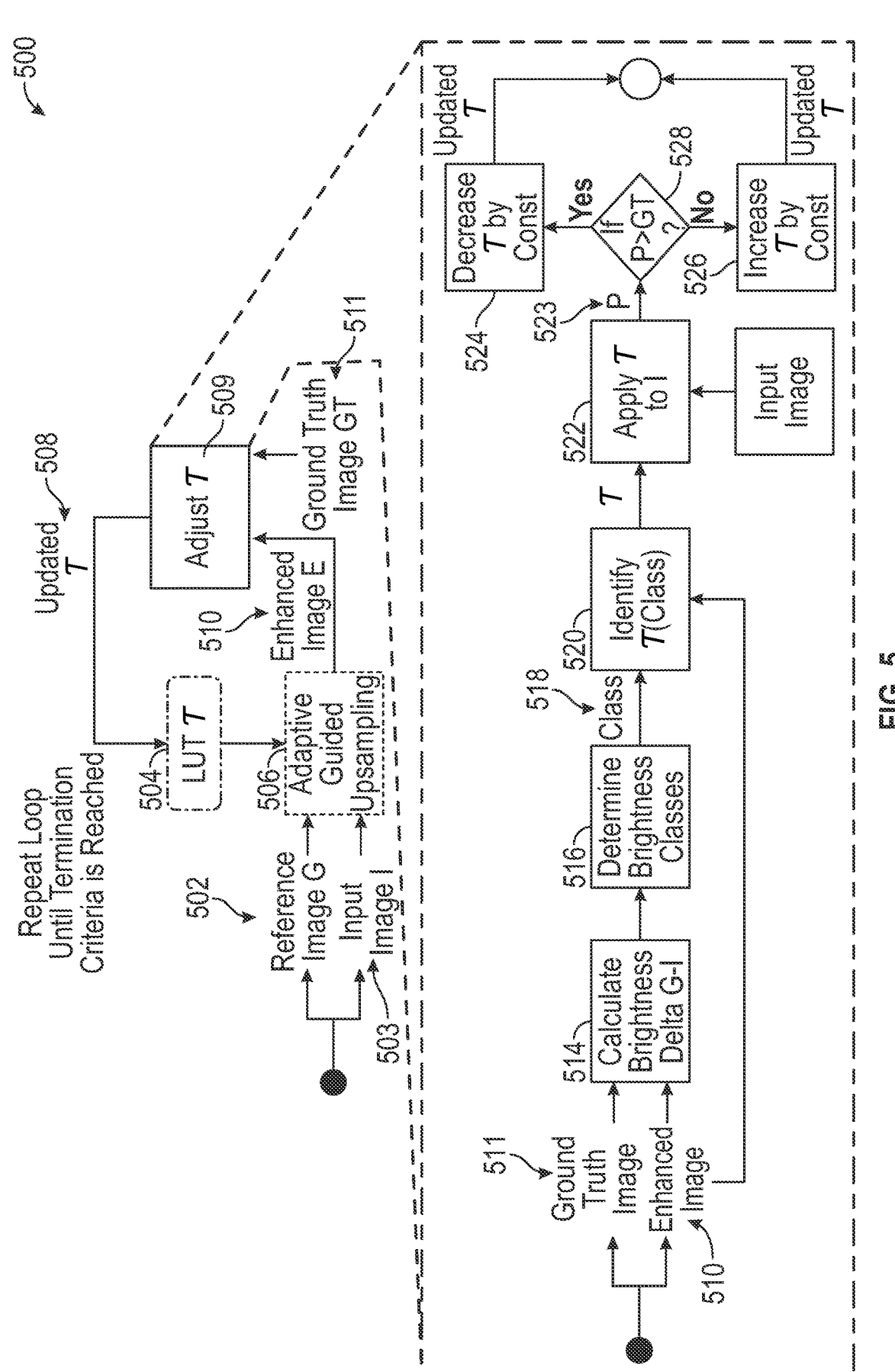
FIG. 5 illustrates brightness training according to some embodiments.

FIG. 5 illustrates brightness training 500 according to some embodiments. As mentioned earlier herein, the brightness parameter τ is used to account for brightness difference between a reference image (e.g., image 103 (FIG. 1) and an enhanced image (e.g., image 108 (FIG. 1). Accounting for brightness difference can make algorithms according to various embodiments brightness invariant. FIG. 5 illustrates operations of a training process for the brightness parameter τ. The training process shown in FIG. 5 includes the brightness parameter t in adaptive guided upsampling (AGU) process and a process to train t.

The reference image 502 (also referred to in some examples as the guidance image) and the input image 503, are provided to AGU 506 (which can be similar to adaptive guided upsampling block 110 (FIG. 1)). The image 502 and the image 503 have a brightness difference (e.g., a brightness delta). The output of the adaptive guided upsampling block 506 can include an enhanced image 510 (similar to the upsampled output image 112 (FIG. 1)). The enhanced image 510 is used to adjust t using a ground-truth image 511 as input, wherein "ground truth" refers to the actual nature of the problem that is the target of a machine learning model, reflected by the relevant data sets associated with the use case in question. The adjusted τ (adjusted in the adjustment block 509) is then written into a Look up Table (LUT) 504 and the process is repeated with the updated τ. τ parameters in the LUT 504 are adjusted incrementally until the termination criteria is met.

Further features of the "Adjust TAU" block 509 are shown in an expanded format in FIG. 5. The input images are the ground truth image 511 and enhanced image 510. At block 514, a brightness delta is calculated between the ground truth image 511 and enhanced image 510 on a pixel-by-pixel basis. As described earlier herein, every pixel is classified into classes 518 at block 516, based on this brightness delta. At block 520, the current τ per pixel for the enhanced image 510 is identified. For example, for a high delta, τ is high, since a higher value needs to be added back to the input to compensate for the brightness difference. Similarly, if the brightness difference is low or negative (e.g., regions in the input image 503 are actually darker than the corresponding pixel in the reference image 502) then a value is subtracted (e.g., τ is negative) to achieve similar brightness levels in both images. At block 522, the τ value is applied to the input image 503 to generate a processed image 523. The processed image 523 is compared to the ground truth image 511 at block 528. If P for each pixel is larger than G for each pixel then block 524 decreases τ else τ is increased at block 526. The updated τ is provided at 508.

Figure 6:
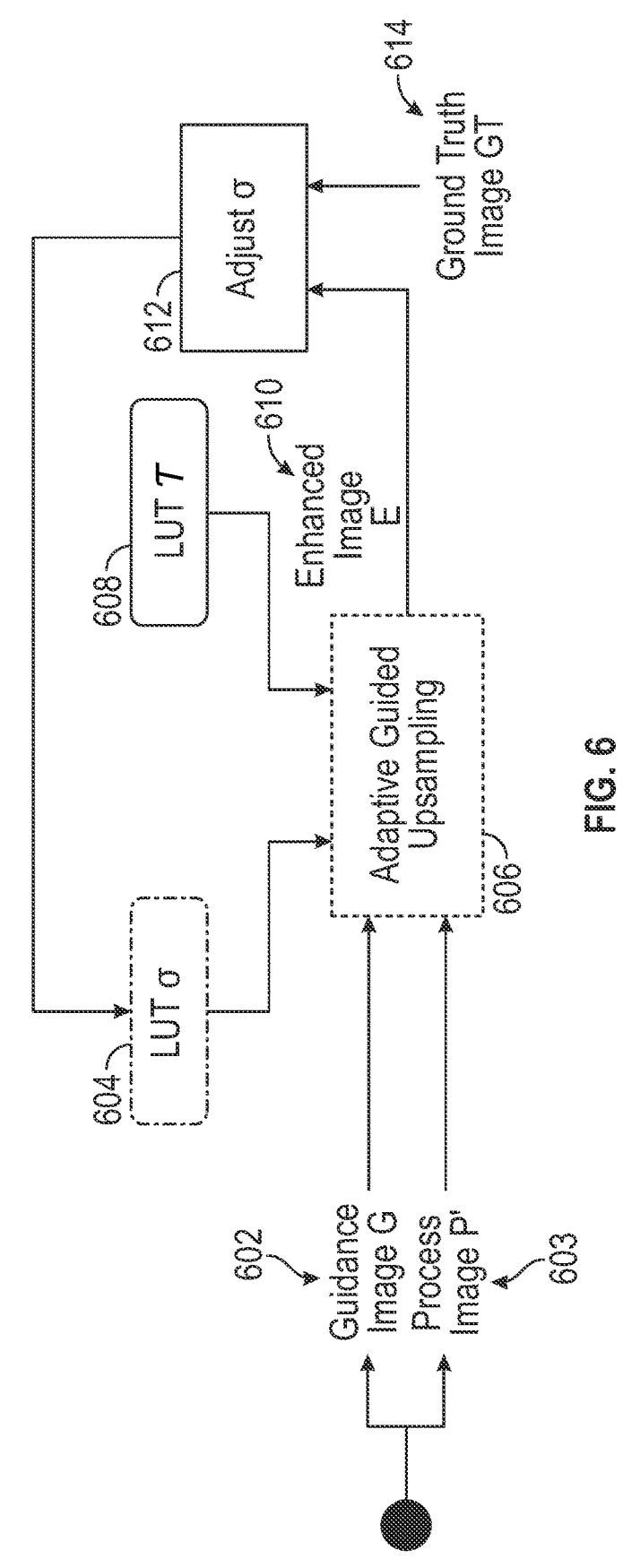
FIG. 6 illustrates noise reduction training according to some embodiments.

FIG. 6 illustrates noise reduction 600 training according to some embodiments. Inputs include the reference image 602 (also referred to in some examples as the guidance image) and the process image 603, which are provided to AGU 606 (which can be similar to adaptive guided upsampling block 110 (FIG. 1)). The output of the AGU 606 can include an enhanced image 610 (similar to the upsampled output image 112 (FIG. 1)). Values for τ are provided to the AGU 606 from lookup table 608. Values for σ are provided to the adaptive guided upsampling block 606 from lookup table 604 such that the noise reduction parameter σ is trained after applying trained τ values as part of the AGU. Gradient descent is used to train σ as opposed to some available training algorithms that use exhaustive search. Lookup table 604 stores updated σ values that have been adjusted based on the adjustment block 612. The ground truth image 614 is also provided to the adjust sigma block 612 wherein ground truth refers to the actual nature of the problem that is the target of a machine learning model, reflected by the relevant data sets associated with the use case in question.

Figure 7:
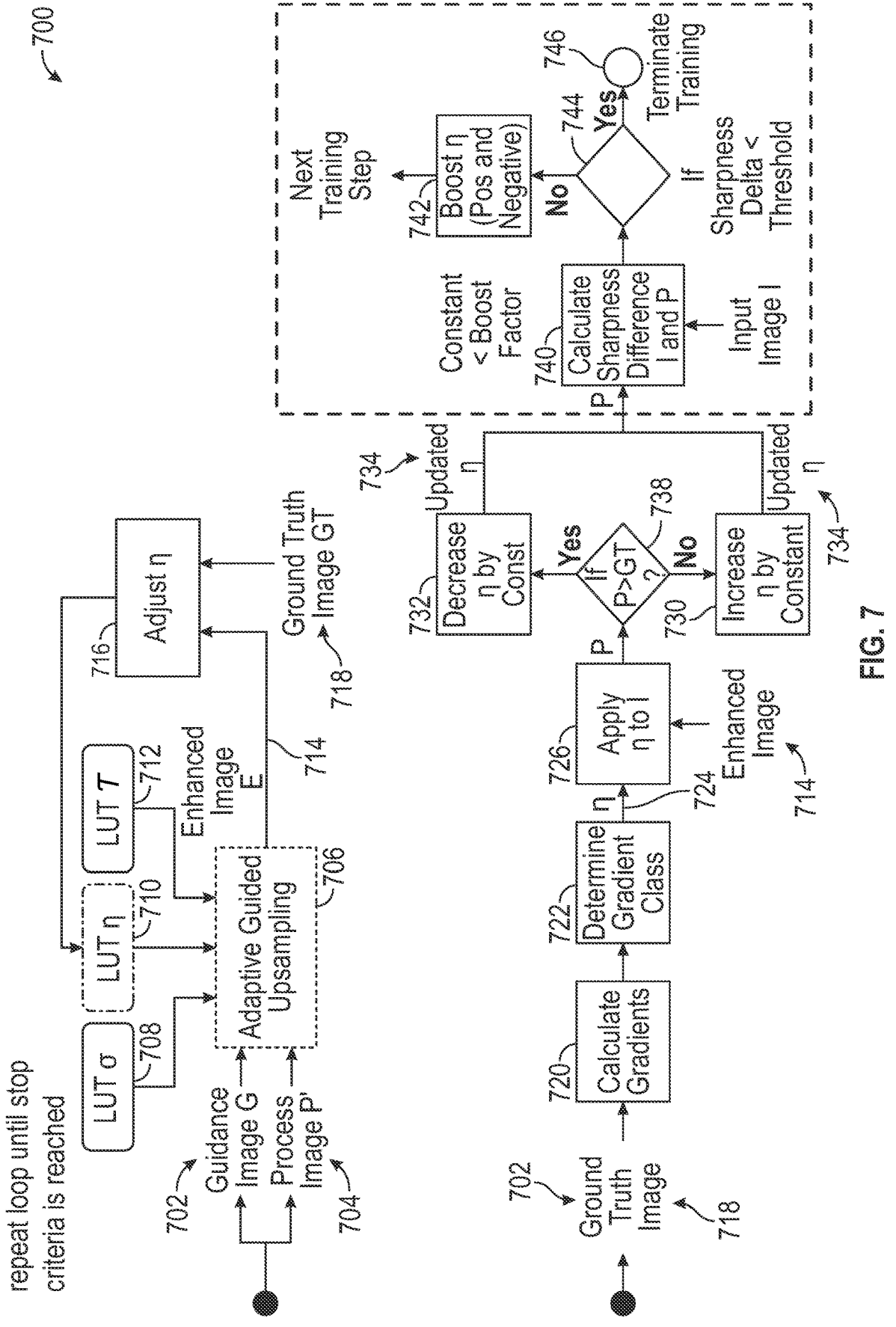
FIG. 7 illustrates sharpness training according to some embodiments.

FIG. 7 illustrates sharpness training 700 according to some embodiments. The ξ parameter accounts for the sharpness restoration. The $\xi_{boosted}$ parameter oversharpens the image to the degree that it maintains its original sharpness after upsampling.

The adjusted $\xi$ is then written to a Look up table. $\xi$ parameters in the LUT are adjusted incrementally until the termination criteria is met. Inputs to sharpness training 700 include the reference image 702 (also referred to in some examples as the guidance image) and the process image 704, which are provided to an AGU 706 (which can be similar to AGU 110 (FIG. 1)). The output of the adaptive guided upsampling block 706 can include an enhanced image 714 (similar to the upsampled output image 112 (FIG. 1)). Pretrained parameters for $\sigma$ and $\tau$ can be provided for noise reduction and brightness invariance respectively. For example, values for $\tau$ are provided to the AGU 706 from LUT 712. Values for $\sigma$ are provided to the AGU 706 from LUT 708. Values for $\xi$ are provided to the AGU 706 from LUT 710. The ground truth image 718 is also provided to the block 716 for updating $\xi$ (e.g., the enhanced image 714 is used to adjust $\xi$ using the ground truth image 718).

Block 716 is broken out in more detail in FIG. 7 to show a process to adjust $\xi$. The input is the ground truth image 718 and enhanced image 714. Ground truth image 718 is used to calculate the gradients across the image at block 720. The purpose of calculating gradients is to differentiate between edges and flat areas. Edges are then labeled into gradient classes at block 722. Each class refers to a target level of sharpness. The current $\xi$ is applied to the enhanced image pixel-wise at block 726 to generate a processed image P. At block 738, P is compared to the ground truth image 718. If P>ground truth $\xi$ is decreased at block 732 else $\xi$ is increased by a constant value at block 730. Updated $\xi$ is then provided as shown at 734.

At block 740, the sharpness difference between I (guidance/reference image) and P is calculated. At block 744 a comparison is performed. If sharpness difference is smaller than a threshold, then the process is terminated at 746. Else a constant sharpness boost factor is added at block 742. Note the constant $\xi$ adjustment factor must be smaller than the boost factor to avoid being an inverse effect.

Figure 8:
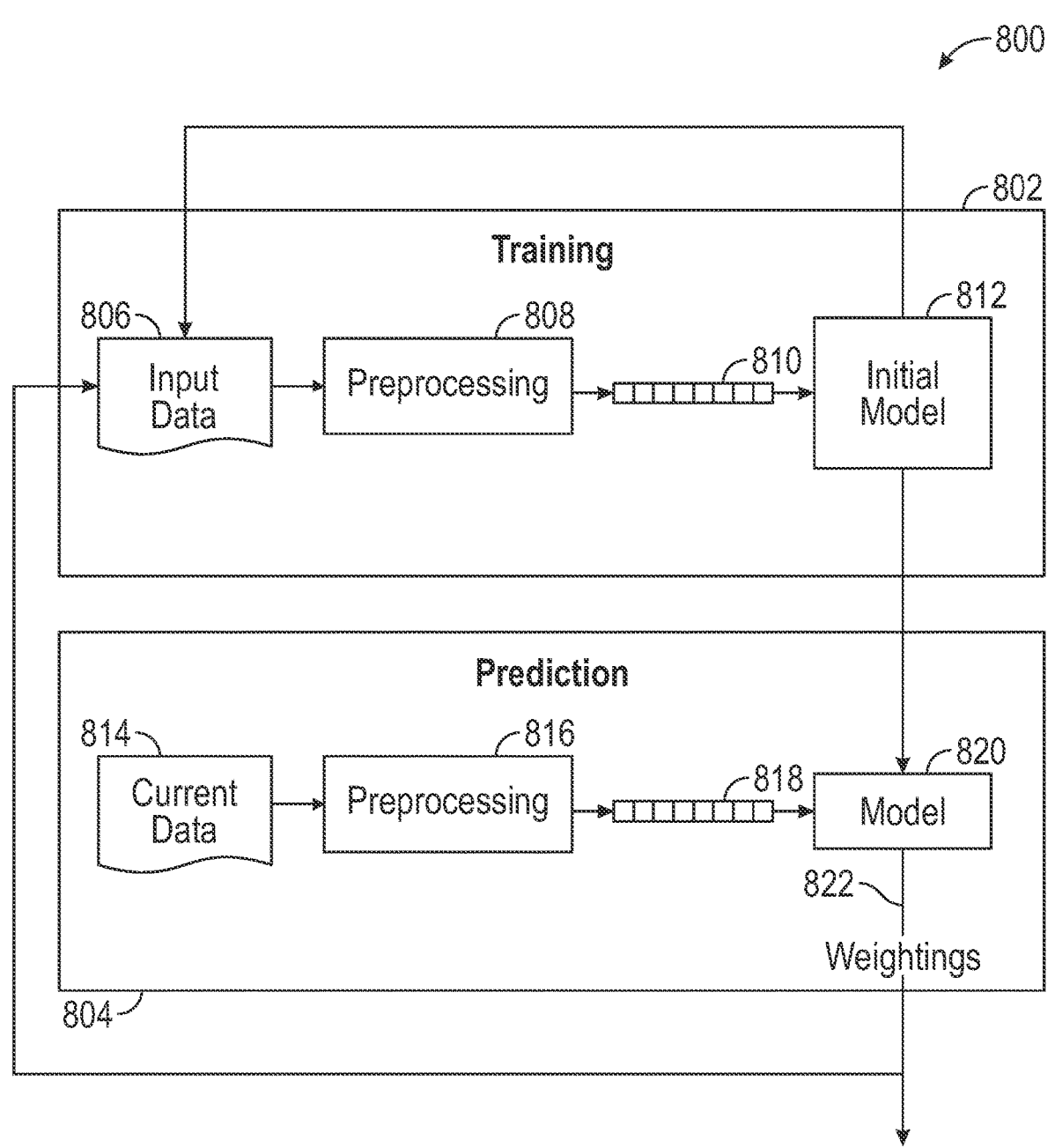
FIG. 8 illustrates machine learning engine for training and prediction in accordance with some embodiments.

FIG. 8 illustrates machine learning engine 800 for training and execution in accordance with some embodiments. The machine learning engine 800 may be deployed to execute during image processing according to any of the algorithms described above for populating elements of the lookup table 422 (values for the $\xi$ (sharpness) parameter), the lookup table 412 (values for $\sigma$, which represents a smoothing parameter (e.g., representative of blur)), and lookup table 424 (values for $\tau$, which accounts for brightness). Each of these parameters can be separately trained with separate machine learning engines 800; however, one machine learning engine 800 is shown in FIG. 8 for clarity.

Machine learning engine 800 uses a training engine 802 and a prediction engine 804. Training engine 802 uses training dataset 806, for example after undergoing preprocessing component 808, to determine one or more features 810. The one or more features 810 may be used to generate an initial model 812, which may be updated iteratively or with future labeled or unlabeled data (e.g., during supervised or unsupervised learning).

As described above, the training dataset 806 incorporates a low-resolution reference image (e.g., image 103 (FIG. 1) or image 402 (FIG. 4)) and input images (e.g., image 104 (FIG. 1) or image 404 (FIG. 4)). The training dataset 806 can include other data such as pixel data including brightness and color data using any color definition or color channel definition (e.g., YUV color spectrum).

In the prediction engine 804, current data 814 may be input to preprocessing component 816. In some examples, preprocessing component 816 and preprocessing component

808 are the same. The prediction/reaction engine 804 produces feature vector 818 from the preprocessed current data, which is input into the model 820 to generate one or more criteria weightings 822. The criteria weightings 822 may be used to output a prediction, as discussed further below.

The training engine 802 may operate in an offline manner to train the model 820 (e.g., on a server). The prediction/reaction engine 804 may be designed to operate in an online manner (e.g., in real-time). In some examples, the model 820 may be periodically updated via additional training (e.g., via updated input data 806 or based on data output in the weightings 822) or based on identified future data to further generalize the initial model. In some examples, the training engine 802 may use a trend analysis over time, for example with a user selected or a model identified range.

The initial model 812 may be updated using further input data 806 until a satisfactory model 820 is generated. The model 820 generation may be stopped according to a specified criteria (e.g., after sufficient input data is used, such as 1,000, 10,000, 100,000 data points, etc.) or when data converges (e.g., similar inputs produce similar outputs).

The specific machine learning algorithm used for the training engine 802 may be selected from among many different potential supervised or unsupervised machine learning algorithms, including commercial algorithms. Examples of supervised learning algorithms include artificial neural networks, Bayesian networks, instance-based learning, support vector machines, decision trees (e.g., Iterative Dichotomiser 3, C9.5, Classification and Regression Tree (CART), Chi-squared Automatic Interaction Detector (CHAID), and the like), random forests, linear classifiers, quadratic classifiers, k-nearest neighbor, linear regression, logistic regression, and hidden Markov models. Examples of unsupervised learning algorithms include Gaussian Mixture models, clustering algorithms, and problem areas such as anomaly detection. In an example embodiment, a regression model is used and the model 820 is a vector of coefficients corresponding to a learned importance for each of the features in the vector of features 310, 318. A reinforcement learning model may use Q-Learning, a deep Q network, a Monte Carlo technique including policy evaluation and policy improvement, a State-Action-Reward-State-Action (SARSA), a Deep Deterministic Policy Gradient (DDPG), or the like.

Once trained, the model 820 may be able to predict brightness shifts (e.g., the t parameter) to make methods according to embodiments brightness-invariant. The model 820 may predict values for $\xi$ (which accounts for sharpness) and $\sigma$ for noise reduction. The model may train only for sharpness improvements for scale invariance. Termination criteria for training can include the number of iterations, image quality obtained, etc.

Figure 9:
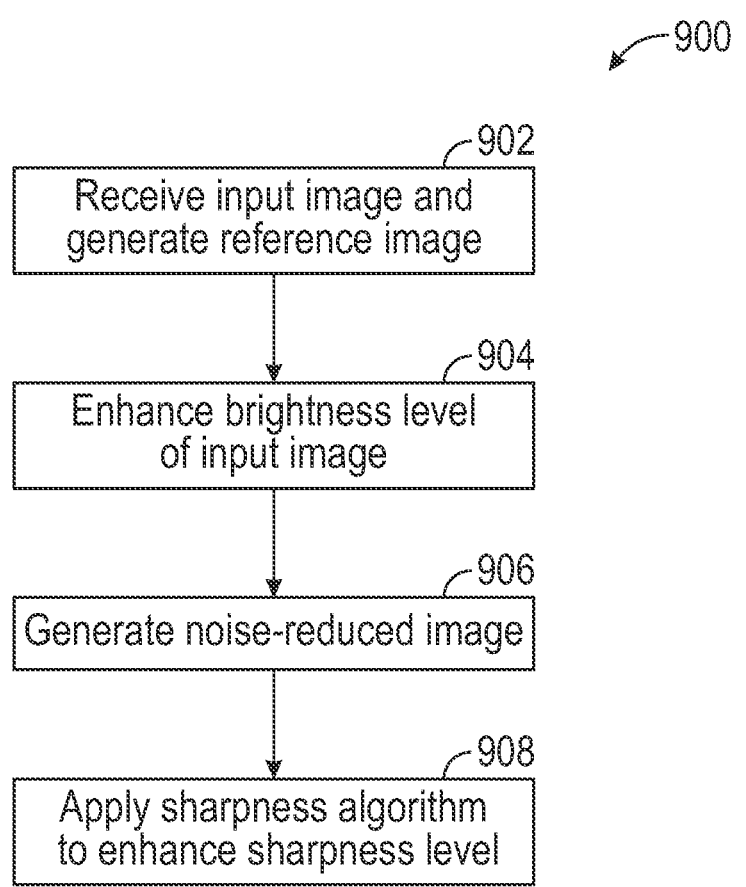
FIG. 9 illustrates a method for image sharpening according to some embodiments.

FIG. 9 illustrates a method 900 for image sharpening according to some embodiments. The method can be performed by computing device circuitry for example any component of FIG. 10 (e.g., processor 1002). Method 900 can begin with operation 902 by the processor 1002 receiving an input image (e.g., image 104 (FIG. 1) and saving the input image 104 as a reference image (e.g., reference image 103 (FIG. 1).

Method 900 can continue with operation 904 with the processor 1002 enhancing a brightness level of the input image to generate an enhanced input image 108. Any of the images 104, 103 and 108 can be used in further processes shown in FIG. 3-7. For example, at operation 906, the processor 1002 can generate a noise reduced image by adjusting pixels of the enhanced input image 108 based on a noise-reduction algorithm and further based on the reference image. For example, adjustments and training can occur as described with reference to FIGS. 5 and 8. Noise reduction algorithms can include comparing, on a pixel basis, the enhanced input image with pixels of the reference image, to generate a low noiseimage by adjusting pixels of the enhanced input image based on the comparing. The noise reduction algorithm can include classifying pixels into a plurality of classes based on the comparing, and identifying a noise reduction adjustment parameter based on the class as described with reference to FIG. 5.

At operation 908, the processor 1002 can implement a sharpening algorithm on the noise reduced image to generate a display image. For example, adjustments and training can occur as described with reference to FIG. 6-8. The sharpening algorithm can include adjusting a sharpening parameter based on whether a corresponding pixel is within the boundaries of the strength of the corresponding edge within the reference image. A linear noise reduction adjustment can be made on a pixel basis based on whether a corresponding pixel is within the boundaries of the strength of the corresponding edge within the reference image. The linear noise reduction adjustment can include adding a minimal blurring effect within the boundaries of the strength of the corresponding edge and adding a higher blurring effect outside the boundaries as discussed for example with reference to FIG. 2. Any of the adjustment parameters described in method 900 can be adapted, updated or adjusted using machine learning algorithms described with reference to FIG. 5-8.

Figure 10:
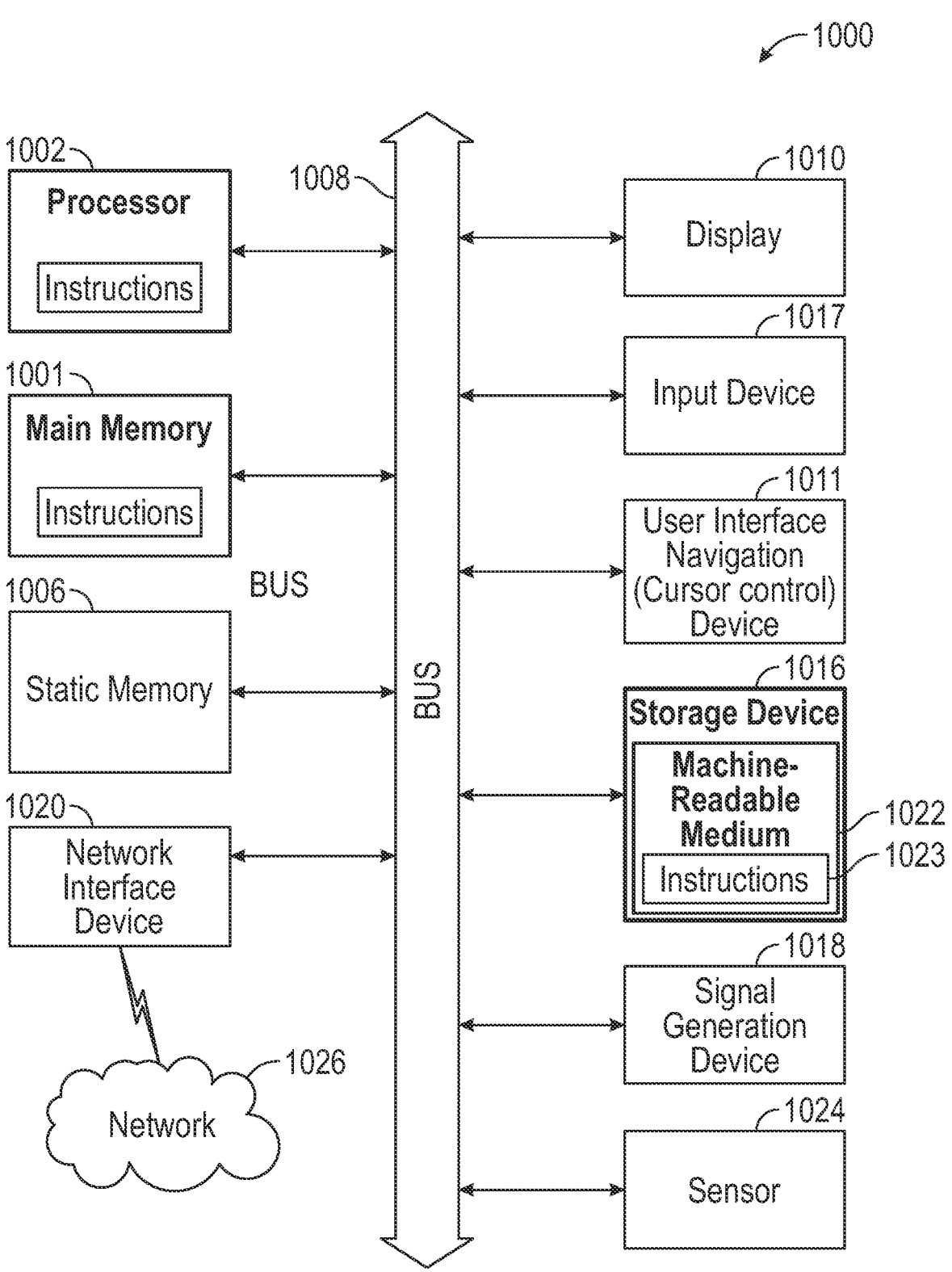
FIG. 10 is a block diagram of a computer architecture upon which one or more of the embodiments disclosed herein can execute.

FIG. 10 is a block diagram illustrating a computing and communications platform 1000 in the example form of a general-purpose machine on which some or all the operations of FIGS. 1-9 may be carried out according to various embodiments. In certain embodiments, programming of the computing platform 1000 according to one or more particular algorithms produces a special-purpose machine upon execution of that programming. In a networked deployment, the computing platform 1000 may operate in the capacity of either a server or a client machine in server-client network environments, or it may act as a peer machine in peer-to-peer (or distributed) network environments.

Example computing platform 1000 includes at least one processor 1002 (e.g., a central processing unit (CPU), a graphics processing unit (GPU) or both, processor cores, compute nodes, etc.), a main memory 1001 and a static memory 1006, which communicate with each other via a link 1008 (e.g., bus). The computing platform 1000 may further include a video display unit 1010, input devices 1017 (e.g., a keyboard, camera, microphone), and a user interface (UI) navigation device 1011 (e.g., mouse, touchscreen). The computing platform 1000 may additionally include a storage device 1016 (e.g., a drive unit), a signal generation device 1018 (e.g., a speaker), a sensor 1024, and a network interface device 1020 coupled to a network 1026.

The storage device 1016 includes a non-transitory machine-readable medium 1022 on which is stored one or more sets of data structures and instructions 1023 (e.g., software) embodying or utilized by any one or more of the methodologies or functions described herein. The instructions 1023 may also reside, completely or at least partially, within the main memory 1001, static memory 1006, and/or within the processor 1002 during execution thereof by the computing platform 1000, with the main memory 1001, static memory 1006, and the processor 1002 also constituting machine-readable media.

While the machine-readable medium 1022 is illustrated in an example embodiment to be a single medium, the term "machine-readable medium" may include a single medium or multiple media (e.g., a centralized or distributed database, and/or associated caches and servers) that store the one or more instructions 1023. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. A non-transitory machine-readable medium including instructions that, when executed on a processor, cause the processor to perform operations including:

receiving an input image and saving the input image as a reference image;

enhancing a brightness level of the input image to generate an enhanced input image;

generating a noise reduced upsampled image by adjusting pixels of the enhanced input image based on a brightness invariant noise reduction algorithm and the reference image; and implementing a sharpening algorithm on the noise reduced upsampled image to generate a display image.

2. The non-transitory machine-readable medium of claim 1, wherein the sharpening algorithm includes adjusting a sharpening parameter based on whether a corresponding pixel is within boundaries of the strength of a corresponding edge within the reference image.

3. The non-transitory machine-readable medium of claim 1, wherein the operations further comprises providing a linear noise reduction adjustment on a pixel basis based on whether a corresponding pixel is within the boundaries of the strength of the corresponding edge within the reference image.

4. The non-transitory machine-readable medium of claim 3, wherein the linear noise reduction adjustment comprises adding a minimal blurring effect within the boundaries of the strength of the corresponding edge and adding a higher blurring effect outside the boundaries.

5. The non-transitory machine-readable medium of claim 1, wherein brightness invariant noise reduction comprises comparing, on a pixel basis, brightness of the enhanced input image with pixels of the lowlight reference image, to generate an image by adjusting pixels of the enhanced input image based on the comparing.

6. The non-transitory machine-readable medium of claim 5, wherein the brightness invariant noise reduction comprises classifying pixels into a plurality of classes based on the comparing, and identifying a brightness adjustment parameter based on the class.

7. The non-transitory machine-readable medium of claim 6, wherein the brightness adjustment parameter is retrieved from a lookup table.

8. The non-transitory The non-transitory machine-readable medium of claim 7, wherein operations further comprise populating the lookup table using a machine learning algorithm.

9. A system for image enhancement, the system comprising:

a camera to provide an input image;

memory to store the input image as a reference image;

processing circuitry configured to:

enhance a brightness level of the input image to generate an enhanced input image;

generate a noise reduced image by adjusting pixels of the enhanced input image based on a brightness invariant noise reduction algorithm and the reference image; and implement a sharpening algorithm on the noise reduced upsampled image to generate a display image; and a display configured to display the display image.

10. The system of claim 9, wherein the sharpening algorithm includes adjusting a sharpening parameter based on whether a corresponding pixel is within the boundaries of the strength of the corresponding edge within the reference image and providing a linear noise reduction adjustment on a pixel basis based on whether a corresponding pixel is within the boundaries of the strength of the corresponding edge within the reference image.

11. The system of claim 9, wherein brightness invariant noise reduction comprises:

comparing, on a pixel basis, brightness of the enhanced input image with pixels of the groundtruth image;

classifying pixels into a plurality of classes based on the comparing;

identifying an adjustment parameter based on the class; and generating a noise reduced image by adjusting pixels of the enhanced input image using the adjustment parameter.

12. The system of claim 11, wherein the adjustment parameter is retrieved from a lookup table and the lookup table is populated based on a machine learning algorithm.

13. A method comprising:

receiving an input image and saving the input image as a reference image;

enhancing a brightness level of the input image to generate an enhanced input image;

generating a noise reduced image by adjusting pixels of the enhanced input image based on a brightness invariant noise reduction algorithm and the reference image; and implementing a sharpening algorithm on the noise reduced upsampled image to generate a display image.

14. The method of claim 13, wherein the sharpening algorithm includes adjusting a sharpening parameter based on whether a corresponding pixel is within the boundaries of the strength of the corresponding edge within the reference image.

15. The method of claim 13, further comprising providing a linear noise reduction adjustment on a pixel basis based on whether a corresponding pixel is within the boundaries of the strength of the corresponding edge within the reference image.

16. The method of claim 15, wherein the linear noise reduction adjustment comprises adding a minimal blurring effect within the boundaries of the strength of the corresponding edge and adding a higher blurring effect outside the boundaries.

17. The method of claim 13, wherein brightness invariant noise reduction comprises comparing, on a pixel basis, brightness of the enhanced input image with pixels of the reference image, to generate an image by adjusting pixels of the enhanced input image based on the comparing.

18. The method of claim 17, wherein the noise reduction algorithm comprises classifying pixels into a plurality of classes based on the comparing, and identifying a noise adjustment parameter based on the class.

19. The method of claim 18, wherein the adjustment parameter is retrieved from a lookup table.

20. The method of claim 19, further comprising populating the lookup table using a machine learning algorithm.

21. The method of claim 13, wherein the brightness invariant noise reduction algorithm generates an upsampled enhanced image wherein enhanced refers to higher sharpness and reduced noise using a lowlight reference image and the enhanced input image.

* * * * *